Dec. 26, 1967  B. J. KUSCH ET AL  3,360,660
POSITION AND RATE READOUT SYSTEM WITH
DUAL PHASE-DISPLACED GRATINGS
Filed April 7, 1965  3 Sheets-Sheet 1

INVENTORS
Bernard J. Kusch,
BY Jack P. Spridco, &
David W. Turner
Hugh L. Fisher
ATTORNEY Dec. 26, 1967   B. J. KUSCH ET AL   3,360,660
POSITION AND RATE READOUT SYSTEM WITH
DUAL PHASE-DISPLACED GRATINGS
Filed April 7, 1965   3 Sheets-Sheet 2

INVENTORS
Bernard J. Kusch,
BY Jack P. Spridco, &
David W. Turner

Hugh L. Fisher
ATTORNEY

Dec. 26, 1967  B. J. KUSCH ET AL  3,360,660
POSITION AND RATE READOUT SYSTEM WITH
DUAL PHASE-DISPLACED GRATINGS
Filed April 7, 1965  3 Sheets-Sheet 3

INVENTORS
Bernard J. Kusch,
BY Jack P. Spridco, &
David W. Turner

Hugh L. Fisher
ATTORNEY

United States Patent Office 3,360,660
Patented Dec. 26, 1967

3,360,660
POSITION AND RATE READOUT SYSTEM WITH DUAL PHASE-DISPLACED GRATINGS
Bernard J. Kusch, Hales Corners, Jack P. Spridco, New Berlin, and David W. Turner, Hales Corners, Wis., assignors to General Motors Corporation, Detroit, Mich., a corporation of Delaware
Filed Apr. 7, 1965, Ser. No. 446,247
11 Claims. (Cl. 250—237)

This invention relates to apparatus for determining the position and rate of change of position of a displaceable body and more particularly to improved electro-optical apparatus for making such determinations to a high degree of accuracy.

Among the various devices for measuring position and rate of change of position of a body which is linearly or angularly displaceable are electro-optical devices in which a spot or line of light is caused to move in some predetermined relationship with body displacement across a photosensitive detector. The photosensitive detector is used to convert the light signals into electrical signals. Transducer means may be provided to produce a series of spaced light figures such as lines which progress in sequence across the detector according to the displacement of the body. This sequence of light lines produces a sequence of electrical pulses from the photosensor. By counting these pulses it may be determined that the body has moved a certain linear or angular distance. Further, by timing the rate of occurrence of the pulses, the rate of displacement of the body may also be determined.

It may be seen that a device meeting the description above provides a position readout which is limited in resolution to the spacing between the light lines. This spacing may be insufficient for many purposes and may produce a pulse rate or frequency which is too low to be easily measured by electronic equipment. Further, it may be seen that the apparatus described above does not provide information regarding the direction of displacement since light lines are incident upon the photosensor in the same sequence and spacing irrespective of the direction of displacement of the body. Further, position readout accuracy may be decreased by inaccuracies or nonuniformities in the spacing between the means producing the discrete light lines.

According to the present invention, the displacement and/or rate of change of displacement of a body may be measured to a degree of resolution not limited to the actual spacing between light figures. In general this is accomplished by apparatus including means for producing a series of substantially uniformly spaced light figures such as short lines which move across an area of projection in predetermined relationship with the displacement of a body such as a rotatable disc. The apparatus further includes means such as a grating for modulating the light figures according to a predetermined function of displacement, and readout means including photosensitive devices positioned to receive the modulated light and to produce a signal which is characterized by a series of discretely identifiable modulations.

Further, the invention provides directional sensitivity such that the particular direction of displacement of the body may be ascertained. This is accomplished by the provision of means such as an offset dual grating disposed across the area of projection for producing two modulated light signals from each incident light figure, which signals are related in phase by a predetermined relation. Readout means may include separate photosensitive means for producing two corresponding phase-related electrical signals and means responsive to the phase-related electrical signals to indicate the extent and direction of displacement.

In accordance with the invention, it is also possible to continuously provide displacement signals for large displacements of the body, for example, over 360° of angular displacement, without the loss of information at any position of the body and without the introduction of cumulative errors due to nonuniformities in the spacing between the light figures. This is accomplished through the presence of a plurality of sets of dual modulating means such as offset gratings disposed so as to intercept the light figures in sequence and spaced apart such that a light figure incident upon at least one of the modulating means for all positions of the displaceable body. Readout means may be provided including in a preferred embodiment photonsensitive means for each portion of each of the dual modulating means for providing electrical signals related to the modulated light received thereby. The readout means may further include tracking means operatively connected to receive in sequential fashion the modulated electrical signals from each of the photosensors associated with the dual modulating means to provide a position readout first according to the displacement of a light figure over one of the dual modulating means and second according to the displacement of a light figure over another of the dual modulating means. The process of effectively switching the position readout between the two successive dual modulating means and associated photosensitive means is preferably performed in a make-before-break manner, that is, both signals are operative during a short overlap period, such that the readout signal from one light figure is perfectly coordinated with the readout signal from the next operative light figure thus eliminating errors due to nonuniformities in the spacing between the light figures.

The invention may be best understood from a description of a specific embodiment thereof such as is given in the following specification. This specification is to be taken with the accompanying figures of which:

The specific embodiment which is described herein with respect to FIGURES 1-4 is a system for providing information regarding the displacement and rate of change of displacement of a body. In general this is accomplished by producing a sequence of substantially uniformly spaced lines of light and indicating through electro-optical means the displacement and rate of change of displacement of the light lines across an area of projection.

Figure 2:
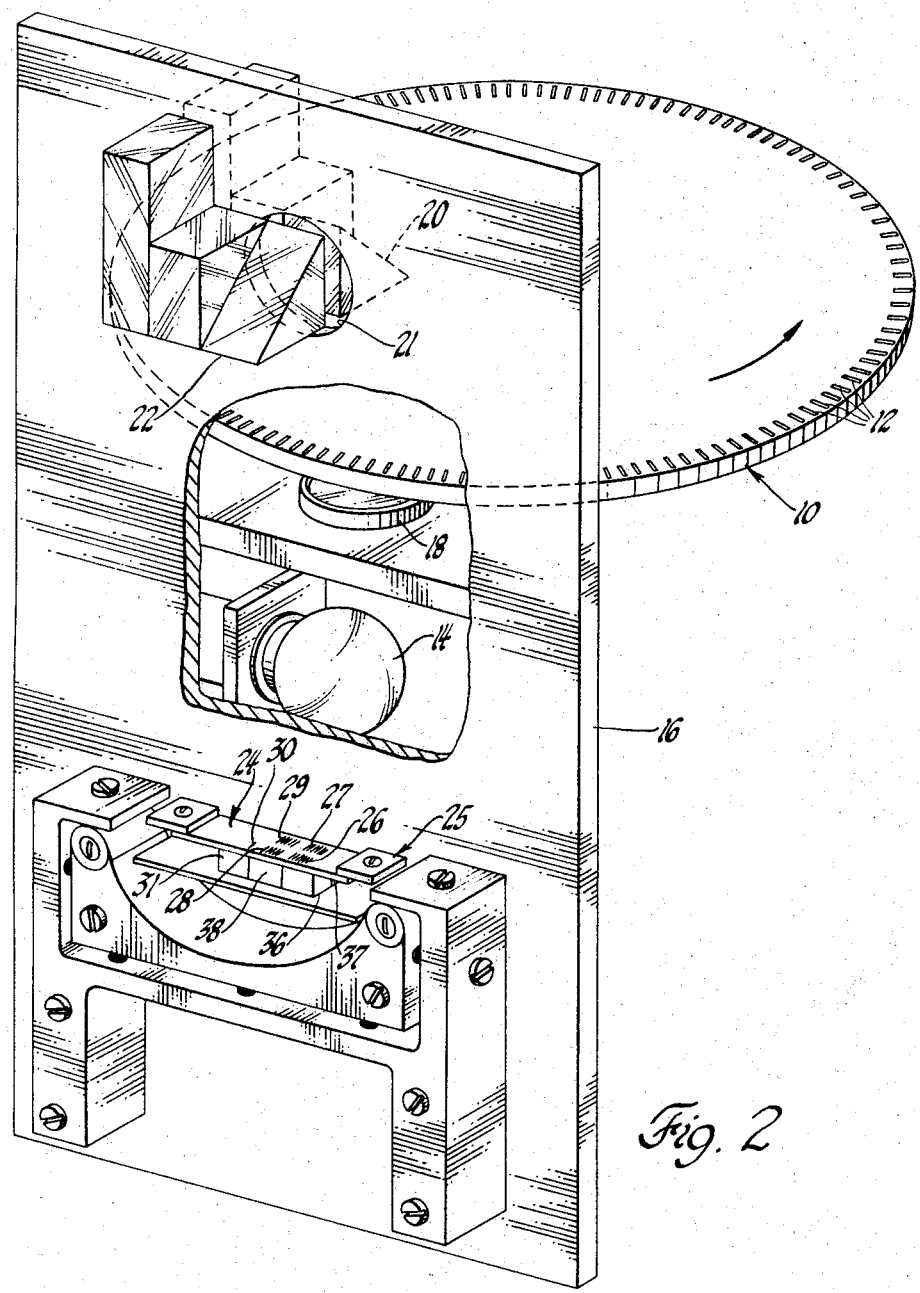
FIGURE 2 is a detailed view of a specific transducer means for providing optical signals representing displacement of a body.
Figure 3:
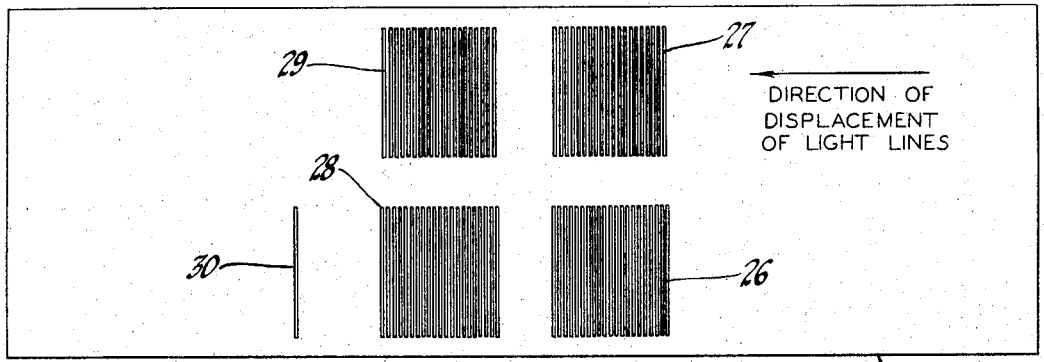
FIGURE 3 is an enlarged detailed view of a specific light modulating means used in connection with the invention.

Referring first to FIGURE 2, there is shown a large disc 10 having a large number of radially extending transparent lines 12 etched or engraved at substantially uniform intervals about an opaque periphery of the disc 10. This disc may be produced by plating a silvered surface about the periphery of a disc of optically true material and etching the lines 12 in the silver to provide the uniformly spaced transparencies. The disc 10 is mounted for angular displacement about a vertical axis as shown in FIGURE 2 in such a manner as to represent the displacement of a primary body (not shown) which may be mechanically connected to the disc 10. In a specific example, the lines 12 may be approximately 8 microinches wide and spaced approximately 10 minutes of arc apart. To produce the light lines which are monitored to provide position and rate of change of position information, a light source 14 is disposed behind an opaque shield 16 so as to direct light through a lens 18 and from the lens upwardly through the periphery of disc 10. The column of light from source 14 passing through the etched periphery of the disc 10 produces a number of light lines corresponding to the lines 12 in the periphery of the disc 10. The light lines are reflected through a first prism 20 mounted on the back of sheld 16 through an aperture 21 in shield 16 to a second prism 22 mounted on the front side of the shield 16, and from prism 22 the images of the light lines are cast upon an area of projection defined by a mask 24. The mask 24 is made of an opaque material but, as better shown in FIGURE 3, is provided with four gratings 26, 27, 28, and 29, each of which consists of a number of parallel apertures. As can be sen in FIGURE 2, the etched lines 12 in the periphery of disc 10 produce a plurality of substantially parallel light line images which through the system 18, 20, 22, are cast upon the mask 24 so as to be substantially parallel with the lines in each of the gratings 26, 27, 28, and 29. In addition, angular displacement of disc 10 in the direction indicated in FIGURE 2 produces a relative displacement of the light line images over the gratings from right to left as shown in both FIGURES 2 and 3. The mask 24 may be precisely positioned with respect to the mounting apparatus 25 by means of the various adjustment screws.

Figure 1:
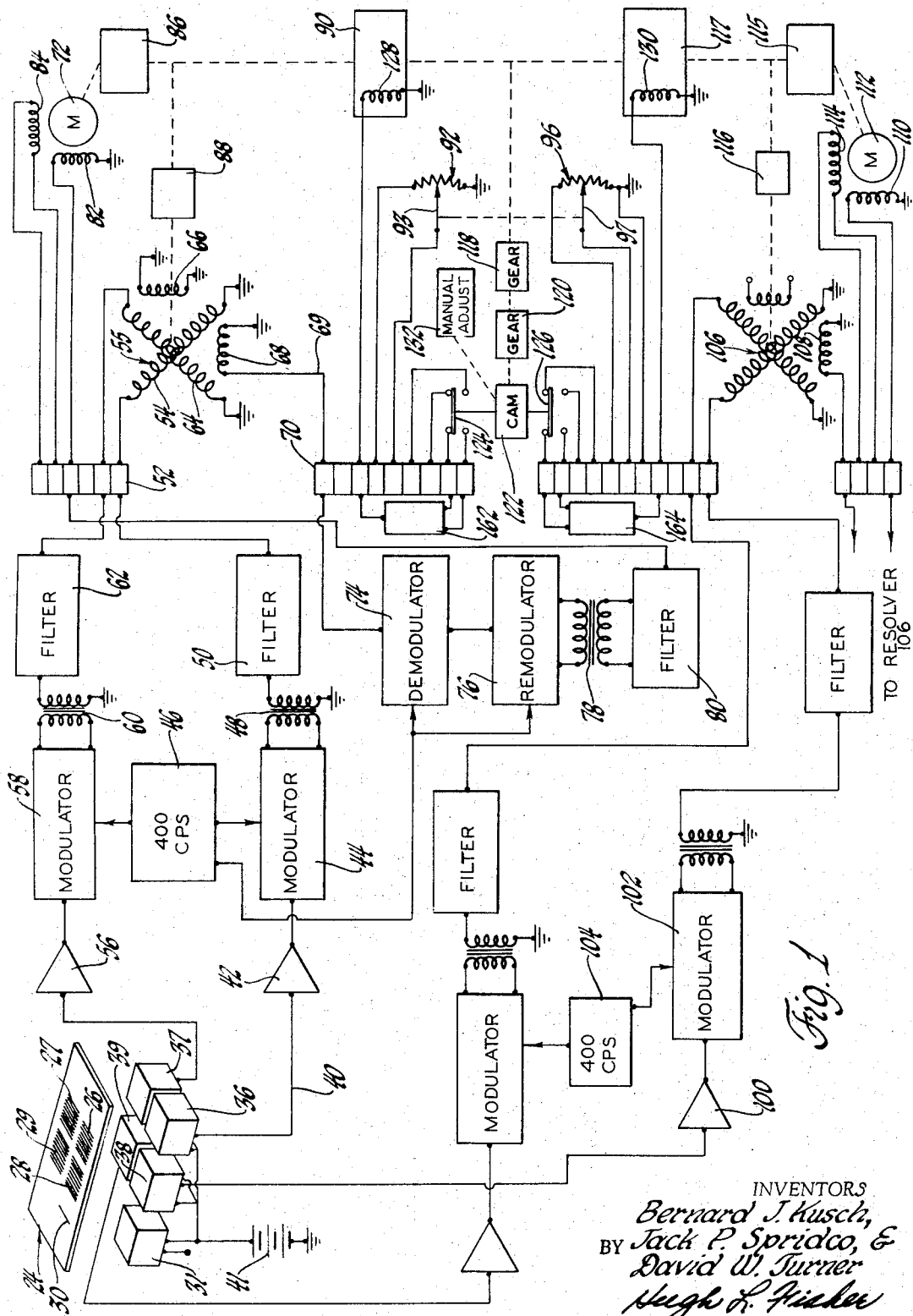
FIGURE 1 is a block diagram of a specific embodiment of a position readout system employing the invention.

Referring to FIGURES 1 and 2, a plurality of photosensitive devices in the form of photocells 36, 37, 38, and 39 are disposed proximate the gratings 26, 27, 28, and 29, respectively, to produce electrical signals corresponding to the light signals incident upon each of the photocells. The photocells thus form part of a position and rate readout system. It can be seen that as a light line image is incident upon one of the gratings 26, 27, 28, and 29 and is displaced over the grating in a direction normal to the grating lines, a modulated light signal will be incident upon the photocell beneath the grating. Due to the fact that the light intensity is not evenly distributed across the width of the light line image, the output signal from the associated photocell closely approximates a sine wave having a frequency related to the rate at which the light line image passes over the lines in the associated grating. Accordingly, the angular position resolution which is obtainable through the subject system is markedly increased by the modulating effect of the gratings which effectively multiplies the quantity of discretely identifiable information from each line image by a factor related to the number of lines in the gratings.

As best shown in FIGURE 3, the gratings 26, 27, 28, and 29, are arranged to form two dual offset grating areas which act as separate modulating means with respect to the light line images. More specifically, gratings 26 and 27 are laterally disposed with respect to the direction of displacement of the light line image and have the grating lines offset, as between the gratings 26 and 27, by 90° of displacement. Accordingly, the light line images which are of sufficient length to simultaneously project upon both gratings 26 and 27 intercept each line in grating 26 at 90° of displacement prior to the interception of the corresponding line in grating 27. Similarly, gratings 28 and 29 form a second dual offset grating in which the lines of grating 28 lead the lines in grating 29 by a phase angle of 90°. It can be seen that the electrical signals of sinusoidal waveform produced by, for example, photocells 36 and 37 will be similar in waveform, but shifted in phase; i.e., the waveform from photocell 36 will lead the signal from photocell 37 by 90 electrical degrees. Similarly, the sinusoidal signal from photocell 38 will lead the signal from photocel 39 by 90 electrical degrees. Due to this phase relation between two simultaneously occurring signals, it is possible by phase detection, as will be apparent to those skilled in the art, to determine the direction of displacement of the light line images over the mask 24. It should also be noted that while it may be possible to use photovoltaic cells for photocells 36, 37, 38, and 39, it is believed to be preferable to employ photosensitive switching devices such as transistors which act as valves to the voltage from a source 41 of predetermined voltage magnitude. While the two dual grating areas 26, 27 and 28, 29 are shown to be linearly spaced apart, it is obvious that a continuous set of apertures might be employed, the effective linear spacing being accomplished by the spacing of the photosensitive devices.

In addition, mask 24 may be provided with a single line aperture 30 having an associated photocell 31 to provide a "start" signal whenever the first light line image passes over line aperture 30 thereby to initiate the position and rate of change of position readout process which is to be described in the following.

Referring now to FIGURE 1, there is shown a readout system employing servo type tracking means for providing information corresponding to the displacement of disc 10 with respect to some predetermined angular reference position. A first selectively utilizable tracking system is connected to receive the signals from photocells 36 and 37. As shown in FIGURE 1, the electrical signal from photocell 36 is connected via conductor 40 to a DC amplifier 42 and to a modulator 44 where it is used to modulate a 400 cycle per second signal received from source 46. The modulated signal is connected through transformer 48 to a filter 50. The filter 50 may be a low pass filter used to eliminate high frequency noise signals. The modulated 400 cycle signal from filter 50 is applied through one section of a coded connector block 52 to a rotor winding 54 of a resolver generally designated at 55. The output from photocell 37 which is a sinusoidal signal lagging the signal from photocell 36 by 90° is similarly amplified at 56 and used to modulate the 400 cycle signal applied to modulator 58. The modulated signal is communicated by way of transformer 60 to a filter 62 and from filter 62 through the coded connector block 52 to the other rotor winding 64 of resolver 55. The resolver 55 also includes a first stator winding 66 which is appropriately loaded and a second stator 68 in which is generated an error voltage which corresponds to the angle between the stator and rotor winding voltages.

The servo or selsyn type tracking system further includes a feedback circuit including a motor 72 which is used to mechanically rotate the rotor windings 54 and 64 of resolver 55 in an attempt to reduce the error voltage produced in stator winding 68 to zero. This feedback path includes a conductor 69 for communicating the voltage on stator winding 68 through a coded connector block 70 to a demodulator 74 where it is demodulated by phase sensitive demodulation techniques with respect to the 400 cycle per second signal received from source 46. The demodulated resolver output signal is remodulated at 76 by combination with the 400 cycle per second signal from source 46 and applied across transformer 78 to a filter 80 which filters out high frequency noise components. The filtered signal is connected through coded connector block 52 to the stator winding 82 of motor 72 where, in combination with a reference voltage applied to stator winding 84 of motor 72, the remodulated voltage tends to rotate the rotor of motor 72. The rotor is mechanically coupled through a first gear set 86 and a second gear set 88 to the resolver rotor windings 54 and 64. According to well-known servo feedback principles, the motor 72 tends to rotate the rotor windings of resolver 55 in an attempt to mechanically null out the error voltage in stator winding 68. Since the signals applied to the rotor windings 54 and 64 are continuously progressive and continuously 90° out of phase in accordance with the passage of light line images over the grates 26 and 27, associated with photocells 36 and 37, the null position will not be reached. Rather, the rotor of motor 72 will continue to rotate in correspondence with the displacement of a light line image over the dual grating consisting of gratings 26 and 27. Accordingly, it may be seen that the mechanical motion produced by motor 72 through the associated gear sets may be taken as an analog representation of the angular displacement of disc 10.

To provide a more intelligible output indication, the output of motor 72 is selectively utilized to operate an output system. To accomplish this, the mechanical output from motor 72 is connected through the gear set 86 to an electrically operated clutch 90. The mechanical motion is transmitted through the electrically operated clutch, when engaged, to output means comprising a pair of potentiometers 92 and 96. Each of the potentiometers may be of the circular type having radial wiper contacts 93 and 97 which are rotated around the circular resistors by the mechanical output of the motor 72. Each of the potentiometers thus provides a voltage which varies in accordance with angular position of the associated wiper contact. This voltage is accordingly a representation of the displacement of disc 10. It is desirable in high precision applications to use two potentiometers, that is, both 92 and 96, inasmuch as circular potentiometers unavoidably exhibit a small discontinuity and the effect of this discontinuity may be avoided through the use of two slightly out of phase potentiometers.

Although not shown in full detail, a second tracking system is connected to receive the signals from photocells 38 and 39 and to treat the signals in a similar fashion to those from photocells 36 and 37. Accordingly, the output from photocell 38 is amplified at 100 and used at 102 to modulate a 400 cycle per second carrier signal from source 104. This modulated signal is transformed and filtered and applied to a first rotor winding of a second resolver 106. Similarly, the signal from photocell 39 is amplified, modulated, filtered and applied to the second rotor winding of resolver 106. Although not shown in detail, it is to be understood that the error voltage generated in stator winding 108 of resolver 106 is demodulated, remodulated, filtered and applied to stator winding 110 of a motor 112. In combination with the reference signal applied across stator winding 114, motor 112 produces a mechanical output which is connected through gears 115 and 116 to the rotor windings of resolver 106 to rotate the windings in an attempt to null out the error voltage produced in stator winding 108. Also, the mechanical output from motor 112 is connected through gears 115 and an electrically operated clutch 117 to the inputs of the potentiometers 92 and 96.

In addition to being connected to the potentiometers 92 and 96, the mechanical outputs from motors 72 and 112, as communicated through electrically operated clutches 90 and 117, respectively, are connected through first and second step-up gear drives 118 and 120 to a cam control system 122. The cam system 122 operates contact means 124 and 126 in alternating fashion such that in general contacts 124 are open while contacts 126 are closed and vice versa. However, the cam is designed such that there is a short period of overlap during which both contacts 124 and 126 are closed. Contacts 124 are employed as control means through energizing means 162 to control the application of an energizing voltage to the energizing coil 128 of clutch 90. Similarly, contacts 126 are connected to energizing means 164 to be used to control the application of a source of energizing voltage to the energizing coil 130 of clutch 117. Accordingly, clutches 90 and 117 are alternately engaged in a make-before-break fashion to alternately utilize the information available from motors 72 and 112 to drive the output potentiometers 92 and 96. In other words there is a short period of time during which both clutches 90 and 117 are engaged; however, in general, they are alternatingly operated.

A general description of the operation of the invention with respect to FIGURES 1, 2, and 3 will now be given. Initially, disc 10 rotates in the direction indicated to cast a plurality of images corresponding to the etched lines 12 upon mask 24. These line images displace from right to left over the surface of the dual gratings 26, 27 and 28, 29. At this point neither clutch 90 nor 117 is engaged. However, the resolvers 55 and 106 in combination with the associated motors 72 and 112, respectively, begin tracking the displacement of light line images over the dual offset gratings. The gratings 26, 27 and 28, 29 are disposed such that one light line image is exiting from the area of sensitivity of the dual grating 28, 29 just as another following light line image is in the entering portion of the dual grating 26, 27. There is a period during which light line images are incident upon both of the dual gratings 26, 27 and 28, 29. Accordingly, there is no discontinuity in the information which is receivable from the associated photocells.

The system may be designed such that the first light line image crossing line aperture 30 engages clutch 90 thereby rotating potentiometers 92 and 96 in synchronism to provide output voltages representing the passage or displacement of light line images over dual grating 26, 27. After the potentiometers have rotated a predetermined distance, the step-up gearing connection between the potentiometers and the cam 22 will have rotated the cam to a predetermined angle thus closing contacts 126. At this point a light line image is in the right-hand portion of dual offset grating 28, 29 as shown in FIGURE 3, as well as in the left-hand portion of dual grating 26, 27, and both motors 112 and 84 rotate in synchronism the potentiometers 92 and 96 through engaged clutches 90 and 117, respectively. Due to this make-before-break connection, motor 112 is automatically placed in exact synchronism with motor 84 as regards the effect on the displacement of the potentiometer wipers. After synchronizing the motors, the cam 122 rotates further to open contacts 124 leaving contacts 126 closed. Accordingly only clutch 117 is engaged and the system follows the displacement of a line image substantially across the dual offset grating 28, 29. As the light line image currently being tracked approaches the exit of dual grating 28, 29, the cam 122 operates as previously described to switch the tracking process back to dual grating 26, 27 by first closing contacts 124 and subsequently opening contacts 126. It can be seen that in this fashion the system is rendered completely insensitive to any nonuniformities in the spacing between the etched lines 12 and the 10 which might otherwise produce a discontinuity in the readout.

As shown in FIGURE 1 it may be necessary to make small adjustments in the position of the cam 122. For this purpose a manual adjust feature 132 is provided. Further, it will be understood that the gear ratios of each of the gear sets 86, 118, and 120 will be chosen in accordance with the particular embodiment of the invention and the degree of resolution desired as well as the desired ratio of resolver revolution to potentiometer revolution.

Figure 4:
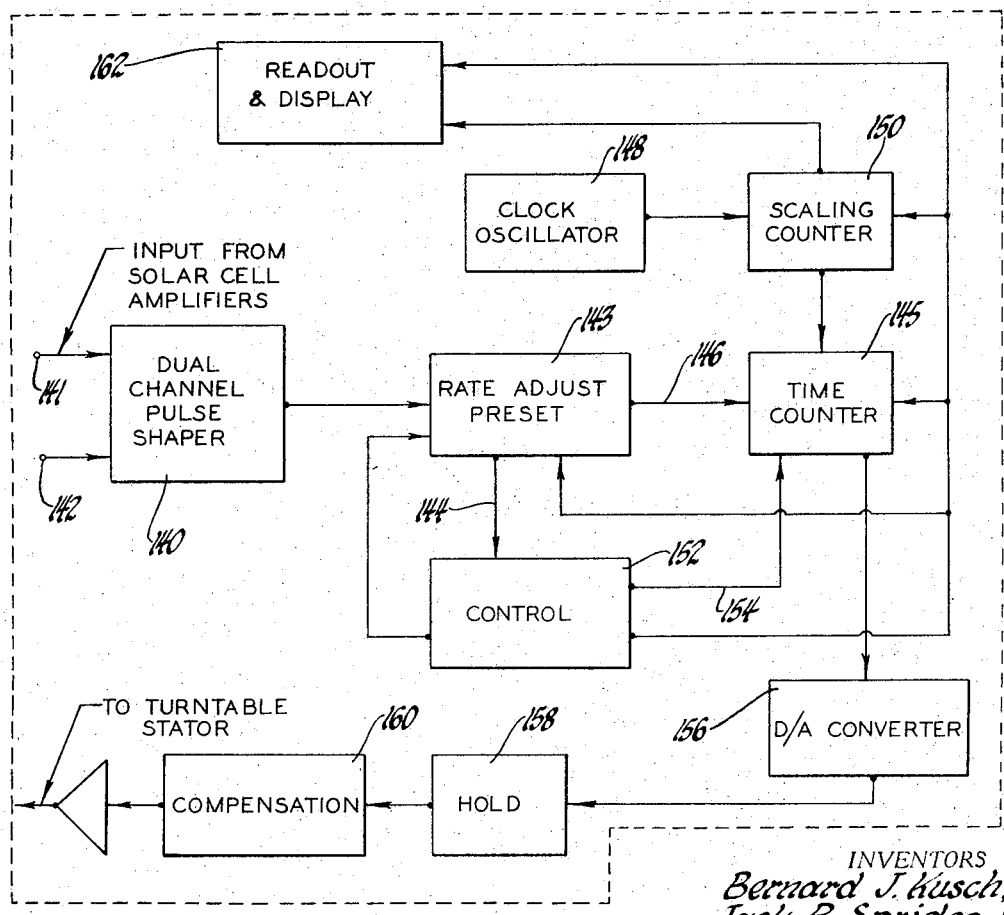
FIGURE 4 is a block diagram of a rate readout system which may be used in connection with the invention.

As suggested earlier in the specification, it is possible to determine the rate of change of position of the etched disc 10 by applying a timing technique to the signals produced by the photocells thereby to determine the number of sinusoidal variations through which one or more of the photocells proceeds within a predetermined time interval. To this end the system shown in FIGURE 4 is applied.

Signals from the photocells 36 and 38, for example, may be applied to inputs 141 and 142, respectively, of a dual channel pulse shaping amplifier 140. The amplifier 140 may effectively digitize the sinusoidal output from the photocells through a Schmitt trigger circuit and subsequent differentiator as is well known to those skilled in the art to provide voltage pulses or spikes occurring at a frequency corresponding to the rate at which sinusoidal signals are received from the photocells. The output from amplifier 140 is applied to a rate adjustment or preset block 143 which is in part a shift-type counter adapted to produce an output signal on line 146 after the occurrence of a predetermined number of input signals received from amplifier 140. The preset block 143 is also in part a means for inserting a predetermined digital value into a time counter 145 via path 146. To determine the number of pulses from amplifier 140 which occur within a predetermined time interval, a clock oscillator 148 is provided to produce pulses at a constant clock rate. These pulses are applied through a scaling counter 150 to the time counter 145 to count the number inserted into the time counter 145 from the preset block 143 back toward zero at the clock rate beginning with a signal from 143, indicating the beginning of a timing period. The end of the timing period is indicated by the occurrence of the next output pulse from the preset counter 143 which occurs on line 144. This pulse on line 144 is transmitted to a control unit 152 which produces in response to that pulse a signal on transfer output line 154 to transfer the remaining count in the time counter 145 to the digital-to-analog converter 156. This remanent number which is transferred from time counter 145 to the digital-to-analog converter 156 is an error signal representing the difference between the actual time between successive pulses from the preset unit 143 and the desired time interval between such pulses. The digital-to-analog converter 156 may be effective to produce a DC signal corresponding to this error signal which may be applied through a holding unit 158 and a compensation unit 160 to the power means (not shown) driving the etched disc 10. This may for example be a turntable motor having a stator which is excited in accordance with the signals from the hold and compensation units 158 and 160 respectively. Thus it is apparent that the error signal may be used in a feedback path to automatically adjust the rate of angular displacement of disc 10.

At the same time it may be desirable to provide a visually readable signal representing the actual rate at which disc 10 is being angularly displaced. This may be accomplished by transferring the total clock count in counter 150 to a readout and display unit 162. This unit may be of various types adapted to read a pulse count and provide a digitized readout thereof.

It is to be understood that although the invention has been described with reference to a specific embodiment, various changes and modifications to this embodiment may be apparent to those skilled in the art without departing from the spirti and scope of the invention. Accordingly, the foregoing specification is not to be construed as limiting the invention. For a definition of the invention, reference should be had to the appended claims.

We claim:

1. In apparatus for monitoring the extent and direction of displacement of a body a first dual grating comprising first and second laterally adjacent sections, the apertures of which have a 90° position phase relation, and first and second photocells associated with the respective sections, a second dual grating fixed in position relative to the first grating and comprising first and second laterally adjacent sections, the apertures of which have a 90° position phase relation, and third and fourth photocells associated with the respective sections means for producing spaced light line images in substantial alignment with the apertures and which are individually displaceable over the first and second dual gratings in succession and in correspondence with the displacement of said body thereby to produce phase displaced signals from the photocells associated therewith, first selectively utilizable readout means connected to the first and second photocells for producing an indication of the progression of a line image over the first dual grating, second selectively utilizable readout means connected to the third and fourth photocells for producing an indication of the progression of a line image over the second dual grating, and control means for alternately utilizing the first and second readout means thereby to continuously follow the progress of line images across the dual gratings.

2. Apparatus for monitoring the extent and direction of displacement of a body including a first dual grating comprising first and second laterally adjacent portions, the apertures of which are offset by a predetermined phase relation, and a first pair of photocells associated with the separate portions of the first grating, a second dual grating fixed in position relative to the first grating and comprising first and second laterally adjacent portions, the apertures of which are offset by a predetermined phase relation, and a second pair of photocells associated with the separate portions of the second grating, means for producing spaced lines of light in substantial alignment with the apertures and which are displaceable over the first and second dual gratings in succession and in correspondence with displacement of said body, first and second selectively utilizable readout means connected to the first and second pairs of photocells, respectively, for producing an indication of the displacement of a light line over the first and second dual gratings, respectively, and control means for alternately utilizing the first and second readout means thereby to continuously track the displacement of light lines across the first and second dual gratings.

3. Apparatus for monitoring the extent and direction of displacement of a body including first and second dual gratings each comprising first and second laterally adjacent portions, the apertures of which are offset by a predetermined amount, the first and second dual gratings being linearly spaced apart, means for producing spaced lines of light which are displaceable over the first and second dual gratings in succession and in correspondence with displacement of said body, first and second photosensitive means disposed proximate the adjacent portions of the first dual grating and responsive to the light lines for producing first and second periodic signals related in phase according to the grating offset, third and fourth photosensitive means disposed proximate the adjacent portions of the second dual grating and responsive to the light lines for producing third and fourth signals related in phase according to the grating offset, first selectively utilizable readout means connected to receive the first and second signals for producing an indication of the displacement of a light line over the first and second dual gratings, respectively, second selectively utilizable readout means connected to receive the third and fourth signals for producing an indication of the displacement of a light line over the first and second dual gratings, respectively, and control means for alternately utilizing the first and second readout means thereby to continuously track the displacement of light lines across the first and second dual gratings.

4. Apparatus as defined in claim 3 including means connected to one of the photosensitive means for producing an indication of the periodicity of the signal therefrom.

5. Apparatus for monitoring the extent and direction of displacement of a body including first and second dual gratings each comprising first and second laterally adjacent portions, the apertures of which are offset by a predetermined amount, the first and second dual gratings being linearly spaced apart, means for producing spaced lines of light which are displaceable over the first and second dual gratings in succession and in correspondence with displacement of said body, first and second photosensitive means disposed proximate the adjacent portions of the first dual grating and responsive to the light lines for producing first and second periodic signals related in phase according to the grating offset, third and fourth photosensitive means disposed proximate the adjacent portions of the second dual grating and responsive to the light lines for producing third and fourth signals related in phase according to the grating offset, first selectively utilizable readout means connected to receive the first and second signals for producing an indication of the displacement of a light line over the first and second dual gratings, respectively, second selectively utilizable readout means connected to receive the third and fourth signals for producing an indication of the displacement of a light line over the first and second dual gratings, respectively and control means for alternately utilizing the first and second readout means in a make-before-break fashion thereby to continuously track the displacement of light lines across the first and second dual gratings.

6. Apparatus for monitoring the extent and direction of displacement of a body including mask means defining first and second dual grating areas each comprising first and second laterally adjacent portions, the apertures of which are offset by a predetermined amount, means for producing spaced lines of light which are displaceable over the first and second dual grating areas in succession and in correspondence with displacement of said body, first and second photosensitive means disposed proximate the adjacent portions of the first dual grating area and responsive to the light lines to produce first and second periodic signals related in phase according to the grating offset, third and fourth photosensitive means disposed proximate the adjacent portions of the second dual grating area and responsive to the light lines to produce third and fourth periodic signals related in phase according to the grating offset, first selectively utilizable readout means connected to receive the first and second signals for producing an indication of the displacement of a light line over the first dual grating area, second selectively utilizable readout means connected to receive the third and fourth signals for producing an indication of the displacement of a light line over the second dual grating area, and control means for alternately utilizing the first and second readout means thereby to continuously track the displacement of light lines across the first and second dual grating areas.

7. Apparatus as defined in claim 6 including means connected to one of the photosensitive means for producing an indication of the periodicity of the signal therefrom.

8. Apparatus for monitoring the extent and direction of displacement of a body including mask means defining first and second dual grating areas each comprising first and second laterally adjacent portions, the apertures of which are offset by a predetermined amount, means for producing spaced lines of light which are displaceable over the first and second dual grating areas in succession and in correspondence with displacement of said body, first and second photosensitive means disposed proximate the adjacent portions of the first dual grating area and responsive to the light lines to produce first and second periodic signals related in phase according to the grating offset, third and fourth photosensitive means disposed proximate the adjacent portions of the second dual grating area and responsive to the light lines to produce third and fourth periodic signals related in phase according to the grating offset, first tracking means connected to receive the first and second signals for producing an output indicative of the displacement of light lines over the first dual grating area, second tracking means connected to receive the third and fourth signals for producing an output indicative of the displacement of light lines over the second dual grating area, output means, first means for selectively connecting the output means to the output of the first tracking means, second means for selectively connecting the output means to the output of the second tracking means, and control means for alternately operating the first and second means in a make-before-break fashion thereby to continuously track the displacement of light lines over the dual grating areas.

9. Apparatus for monitoring the extent and direction of displacement of a body comprising means for projecting spaced optical images across an area of projection at a rate of displacement related to the rate of displacement of a body, first optical transducer means disposed over a first portion of the area of projection for producing first and second electrical signals of corresponding waveform but displaced in phase by a predetermined angle, second optical transducer means disposed over a second portion of the area of projection for producing third and fourth electrical signals of corresponding waveform but displaced in phase by said predetermined angle, first and second servo means connected to the first and second optical transducers, respectively, and responsive to the signals produced thereby to produce mechanical outputs of a character related to the phase difference between said electrical signals, output signal generating means responsive to a mechanical input to produce an output signal, first and second selectively engageable clutch means for connecting the first and second servo means, respectively, to the output signal generating means, and control means for alternately engaging the first and second clutch means in a make-before-break manner thereby to preclude a discontinuity in the output signal due to irregularity in the spacing of said optical images.

10. Apparatus for monitoring the extent and direction of displacement of a body, the apparatus comprising means for projecting spaced uniform optical images across a predetermined area, the rate and direction of displacement being related to the displacement of said body, mask means defining first and second modulating portions, respectively, of the area for producing a predetermined modulation in the character of the images projected therethrough as a function of displacement of the images, the first and second portions being relatively disposed such that the moving images successively encounter the individual portions, first and second photosensitive means disposed adjacent the mask means for receiving the progressively modulated images from the first and second portions, respectively, and for producing electrical signals related thereto, first and second servo means connected to the first and second photosensitive means, respectively, for producing mechanical outputs of a character related to said electrical signals, output signal generating means responsive to a mechanical input to produce a position indicating output signal, first and second selectively engageable clutch means for connecting the first and second servo means, respectively, to the output signal generating means, and control means for alternately engaging the first and second clutch means in a make-before-break manner thereby to preclude a discontinuity in the output signal due to irregularity in the spacing of said optical images.

11. Apparatus for monitoring the extent and direction of displacement of a body comprising means for projecting spaced light line images across an area of projection and for displacing said images over said area in correspondence with the displacement of said body, a first dual grating occupying a first portion of the area for dividing the line images incident thereon into two periodic optical signals of constant relative phase displacement, first and second photosensitive means operatively associated with the first dual grating for producing two electrical signals of constant relative phase displacement, a second dual grating occupying a second portion of the area for dividing the line images incident thereon into two periodic optical signals of constant relative phase displacement, third and fourth photosensitive means operatively associated with the second dual grating for producing two electrical signals of constant relative phase displacement, the first and second dual gratings being relatively disposed so as to receive the individual line images in succession, first and second servo means responsive to electrical signals to produce a mechanical output of a character related to the phase difference between the electrical signals applied thereto, the first servo means being connected to receive the electrical signals from the first and second photosensitive means and the second means being connected to receive the electrical signals from the third and fourth photosensitive means, output signal generating means responsive to a mechanical input to produce an output signal, and control means for alternately engaging the first and second clutch means in a make-before-break manner thereby to preclude a discontinuity in the output signal due to irregularity in the spacing of said optical images.

References Cited

UNITED STATES PATENTS

| | | | |
|---|---|---|---|
| 2,886,717 | 5/1959 | Williamson et al. | 250—220 |
| 3,040,222 | 6/1962 | Kunz | 318—32 |

RALPH G. NILSON, *Primary Examiner.*

M. ABRAMSON, *Assistant Examiner.*